April 21, 1964 S. J. LORING 3,130,084
SOLAR THERMOELECTRIC GENERATOR
Filed March 14, 1960 2 Sheets-Sheet 1

INVENTOR
SAMUEL J. LORING
BY Vernon F. Hauschild
ATTORNEY

April 21, 1964     S. J. LORING     3,130,084
SOLAR THERMOELECTRIC GENERATOR
Filed March 14, 1960     2 Sheets-Sheet 2
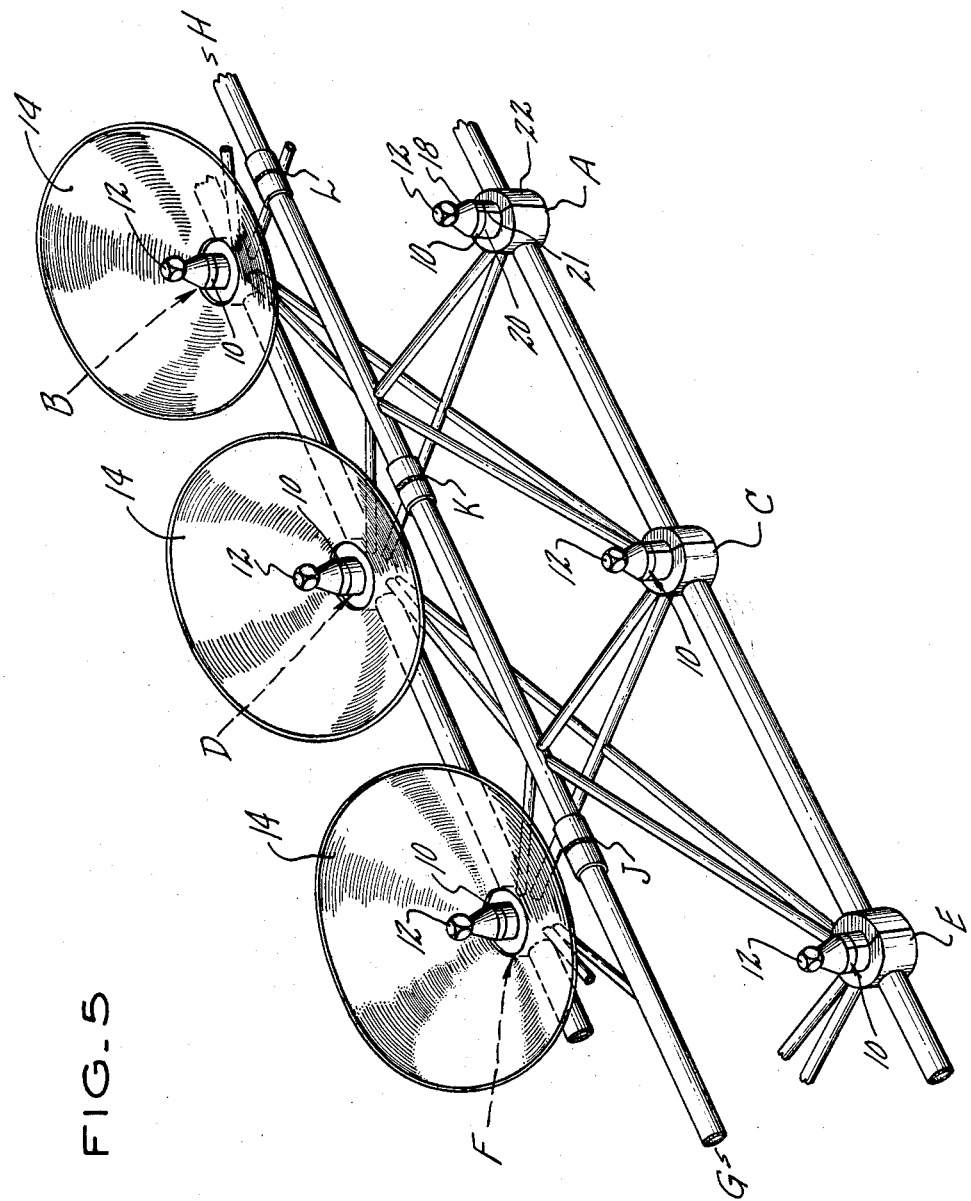
INVENTOR
SAMUEL J. LORING
BY Vernon F. Hauschild
ATTORNEY

United States Patent Office 3,130,084
Patented Apr. 21, 1964

3,130,084
SOLAR THERMOELECTRIC GENERATOR
Samuel J. Loring, West Hartford, Conn., assignor to United Aircraft Corporation, East Hartford, Conn., a corporation of Delaware
Filed Mar. 14, 1960, Ser. No. 14,703
5 Claims. (Cl. 136—4)

This invention relates to a means of generating electrical energy, and particularly to the utilization of the free energy provided by the sun for producing electrical power for use in space missions.

The availability of solar energy throughout the inner solar system makes its use attractive as an energy source for a power supply in some space applications. In the past there have been several approaches to the production of energy by utilizing the sun's rays. One of these methods uses a photovoltaic cell to convert radiant energy directly to electric power. These devices are relatively expensive, and subject to meteoritic damage. Another approach is that of thermal cycle conversion which utilizes a boiler and closed-cycle turbine to drive a generator. Heat is supplied by a reflector focused on the boiler, and the heat is rejected by a space radiator. The moving parts of the rotating machinery of this conversion system introduce problems of reliability as do the dangers of loss of working fluid due to micrometeorite damage. Protection against meteoritic damage would, of course, increase the weight of the device, because the space radiator as a separate unit is an important weight item in such systems. Another method of direct conversion of heat to electricity utilizes the phenomena of thermionic emission, but such systems are still in the research stage, and the required high temperatures necessitate extremely sharp focusing which is very difficult to achieve in practice.

The present invention avoids the deficiencies in the prior art devices by directing the radiant energy from the sun towards a multiplicity of thermocouples each with its own small reflector, and converting the heat energy directly into electrical energy, avoiding the necessity of a heat transfer fluid and using the reflector which directs the sun's rays also to radiate the heat back into space.

It is, therefore, an object of this invention to convert energy received from the sun into electrical energy by the use of reflectors and thermoelectric devices.

A further object of this invention is a solar thermoelectric generator which is economical and light in weight, yet is strong, rugged, and reliable and which has a high electrical power output per pound of weight.

Another object of this invention is a solar thermoelectric generator which is suitable for folding into small and compact form and which is not readily subject to meteoritic damage.

A still further object of this invention is a solar thermoelectric generator which has no moving mechanical parts and no working or heat transfer fluid to escape.

Another object of this invention is a solar thermoelectric generator which can be combined into an array and which can supply a wide combination of voltages and currents.

A further object of this invention is a solar thermoelectric generator in which assembly of an array is made less critical by directing the reflectors independently in a single assembly operation along the optical axis of the array to correct all manufacturing tolerances developed in the fabrication of the array.

Another object of this invention is an array of solar thermoelectric generators which will maintain parallelism of individual reflector axes despite temperature changes of the supporting members when the array passes from the sunlight into the earth's shadow or from the earth's shadow into the sunlight.

A further object of this invention is to provide a solar thermoelectric generator in which multiple purpose use is made of those parts which require extensive dimensions.

Other objects and a fuller understanding of the invention may be had by referring to the following description and claims, taken in conjunction with the accompanying drawings in which:

FIG. 5 shows a typical portion of an array of thermoelectric generator unit cells with some of the reflectors removed for clarity.

Figure 1:
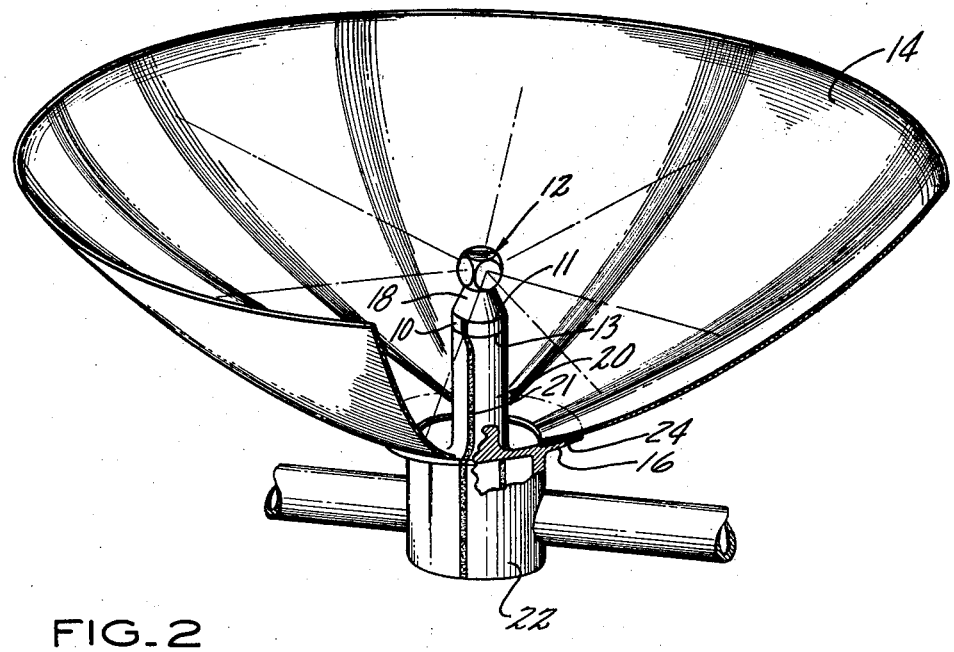
FIG. 1 shows a cutaway view of a single thermoelectric generator unit cell.

A principal feature of the solar thermoelectric generator is its composition of a large number of relatively small unit cells each of which comprises a thin metal paraboloidal reflector and a single power generating thermocouple. Arrangement of the unit cell is shown in FIG. 1. The hot junction 11 of the thermocouple 10 receives heat by virtue of its thermal contact with a small radiation collector 12 which absorbs concentrated solar rays at the focus of the paraboloidal reflector 14. The thermocouple cold junction 13 is in thermal contact with the metal reflector 14 and is cooled by radiation from the highly emissive back surface of reflector 14.

The construction and functional operation described provides the same surface area for radiation of rejected heat as is required for interception of solar rays and utilizes the same supporting sheet for both. Moreover, it has the simplicity that heat transfer is accomplished entirely by metallic conduction largely through employment of the reflector radiator support sheet 14 as a thermal conductor. The conduction path lengths are proportional to the unit cell's size and can be made as short as desired by adoption of small sized unit cells. The theoretical maximum amount of electrical output per unit weight can be shown to be inversely proportional to square of the diameter of the reflector. For this reason, relatively small unit cells are favored. A 4" diameter reflector for the unit cell has been found to be near optimum in view of fabrication limitations on extremely thin sheet metal parts.

Figure 2:
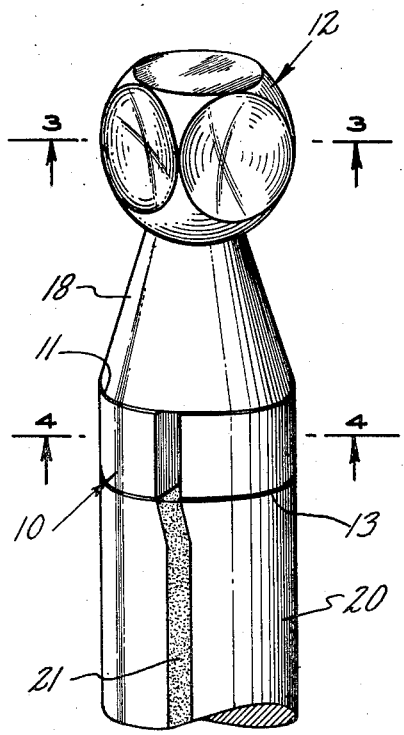
FIG. 2 shows an enlarged view of the radiation collector and thermocouple assembly.
Figure 3:
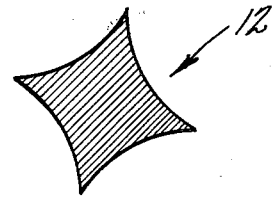
FIG. 3 is a section taken along lines 3—3 of FIG. 2.
Figure 4:
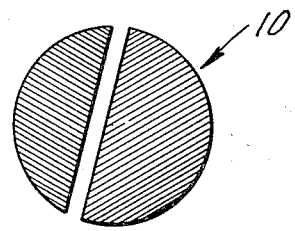
FIG. 4 is a section taken along lines 4—4 of FIG. 2.

Construction of the radiation collector and thermocouple assembly is illustrated in FIG. 2. Radiation absorbed by collector 12 is transformed into heat and is conducted to the base of conduction cone 18 which forms one face of the thermocouple hot junction 11. The collector 12 and conduction cone 18 are integral and consist of copper of high conductivity; the collector surface is blackened for high absorbtivity while the conduction cone is polished to minimize heat loss by reradiation. FIG. 3 shows that the four sides of collector 12 are cut out to form concave faces. This will make the collector lighter and will allow the radiation to strike the collector normal to the surface of the collector faces for greater efficiency. The physical size of collector 12 is determined by the optical system and the accuracy of the focusing of radiation from reflector 14. The thermocouple cold junction 13 and electrical lead terminals are the joints between the thermocouple legs and the two halves of a split supporting shaft 20. The thermocouple element 10 is split into two legs separated from each other; one of the two legs is composed of "n" type thermoelectric material and the other leg is composed of "p" type thermoelectric material. FIG. 4 shows that the legs of thermocouple 10 are unequal. This is necessary in order to optimize the response of the thermocouple due to the differences in the thermoelectric materials. Cone 18 can be made of proper size to conduct heat from collector 12 to thermocouple 10, and cone 18 will be lengthened and the thermocouple 10 will be positioned at a greater physical distance from collector 12 if the system requires that thermocouple 10 be made of a large size. In this way cone 18 will be prevented from interfering with the radiation from reflector 14 regardless of the size of the thermocouple. The halves of shaft 20 form electrical leads and the thermal conduction paths for heat rejection from the cold thermocouple junction 13. It is thus necessary to electrically insulate the halves of shaft 20 from each other as shown by the electrical insulating cement 21.

As shown in FIG. 1, the halves of the split supporting shaft 20 form parts of the two halves of the radiator support flange 16, which provides a seat for attachment of the reflector sheet 14, and a split cylindrical barrel 22 extending below the flange. The paraboloidal reflector sheet 14 is cemented to the spherical seat formed by the upper surface of the flange 16 through an electrical insulating layer 24, thin enough to provide a good thermal conduction path for rejected heat from shaft 20 through radiator support flange 16 to paraboloidal sheet 14. The thermally conductive and simultaneous electrically insulating property is readily achievable in layers in the order of .001 inch thick, since electrical resistivities are typically millions of times greater than thermal resistivities. The rejected heat is conducted outward through the metal paraboloidal reflector 14 and radiated into space from its highly emissive convex surface. The back surface of reflector 14 should be blackened for higher emissivity.

The split cylindrical barrels 22 extending below the reflector support flange 16 form panel points of a three-dimensional truss which supports a double row of basic generator cells. A model of this truss with thermocouple generators attached, but with some reflectors removed, is shown in FIG. 5. The truss members are thin-walled aluminum alloy tubes brazed at all junction points. The two halves of the panel point fittings are made integral by a light cap cemented into the lower end of cylindrical barrel 22, by cementing together the two halves of the split shaft 20, and by the reflector sheet 14 being cemented to the radiator support flange 16; however, these two halves are kept electrically insulated from each other to form a portion of the electrical leads from the thermocouple generator. The electrical insulation may be by means of an insulating cement, or by an air gap between halves of barrel 22. The truss members themselves form the balance of the electrical leads to the edge of the generator array. In the configuration shown in FIG. 5, thermocouple pairs, such as A, B and C, D and E, F are electrically connected in paralleled pairs, while these paralleled pairs are connected in series along the length of the truss. All truss members serve as electrical conducting leads with the exception of the upper longitudinal members G, H, which must be electrically discontinuous between successive bays of the truss, and are shown electrically broken at J, K and L. The cross bracing members in the truss serve to electrically cross connect each adjacent pair of paralleled thermocouples so that destruction of any single thermocouple will not open circuit the array.

The structure thus far described constitutes a double-rowed panel of unit solar generator cells of indefinite length mounted on a rigid three-dimensional truss, the members of which serve as an electrical lead to the edge of a generator array. This panel serves as a convenient and versatile basic subarray from which to build specific purpose generators. Combinations of these basic panels of suitable length may be placed side by side to meet specific requirements as to area, shape, and folding, and their configurations depend entirely upon specific mission requirements. Means must also be provided to orient a complete generator array towards the sun at all times.

It is necessary that the axes of all the reflectors of an array be aligned closely to a single optical axis of the entire panel. The construction herein described permits this alignment of each reflector individually as a final assembly operation. A complete supporting truss for a panel, with thermocouples and collector-cone assemblies attached, but without reflectors, is assembled with individual thermocouple support shafts 20 and reflector support flanges 16 aligned to a reasonably wide and readily achievable angular tolerance. The final assembly step is the cementing of the reflectors 14 on the spherical seats formed on the tops of the flanges 16. Centers of these spherical seats are at the centers of the radiation collectors 12 and at a distance from the seats equal to the focus of a reflector. Hence, for any position of a reflector on its spherical positioning seat, the focus of the reflector will fall at the center of the radiation collector 12. By movement of the reflector sheet 14 on its spherical seat, the axis of the reflector may be directed with its focus always in the correct location. Reflectors can, therefore, be directed independently in a final assembly operation along the optical axis of a panel to correct all manufacturing tolerances developed in a trust fabrication.

A second requirement of panel construction is the maintenance of parallelism of individual reflector axes despite temperature changes of the supporting truss when the array passes from sunlight into the earth's shadow. The truss lies on the dark side of the reflectors; during sunlight truss members are heated by conduction from reflectors, radiation from the reflector backs and the earth and some direct sunlight falling between reflectors. Surface coatings of the truss members, such as anodizing with varying colors, plating, etc., will be provided with emissivities determined so that all truss members acquire the same average temperature along their lengths during sunlight operation. The members will all acquire an equal though lower temperature during the dark interval. Hence, in passing from sunlight to shadow, or shadow to sunlight, an array would undergo a linear contraction or expansion, but would maintain parallelism of all reflector axes.

The reflector sheet, tubular truss members and panel point fittings may be made from aluminum alloy in the hard state; copper may be used for the radiation collector and conduction cone. Lead telluride doped with sodium or lead iodide may be used to produce, respectively, "n" and "p" type thermocouple legs in the thermoelectric material.

The subject generator is invulnerable to pinhole punctures by micrometeors because there is no working or heat transfer fluid to escape and because none of the conducting, reflecting, radiating, or structural functions of the extended parts of an array, truss members and reflectors, suffer from small punctures. Direct hits upon the radiation collector, cone or thermocouple elements are unlikely because of the smallness of these parts. Even in the rare event that a direct hit on any of these assemblies unbonds a thermocouple element, the array will not be open circuited because of the cross-connected parallel electrical connection of pairs of unit cells in a panel.

The power conversion means has the advantage that it has no moving mechanical parts. The entire power cycle including radiation collection, heat transfer, energy conversion, and heat rejection takes place by virtue of the static properties of materials and material surfaces and their relative positions. Thus, problems of wear, breakage, or bearing and lubrication requirements of power carrying moving mechanical parts, and of handling or leakage of a heat transfer fluid are not encountered. Mechanical integrity of actuators for the required two axis orientation of an array is much less difficult to achieve than for power conversion or pumping mechanical mechanisms because the former are essentially slow moving positioners and are not subject to either the loading or high sliding speeds of the latter.

Ruggedness of the array to back up the reliability inherent in its static mode of operation and invulnerability to micrometeors is provided by the efficient three-dimensional truss structure around which the basic panels are built and the structural effectiveness of the configuration of the unit cells. The reflectors and thermocouples are supported directly on the panel points of the truss. Doubly curved reflectors increase in thickness towards their support flanges where most strength and stiffness are needed. Small thermocouple elements and radiation collectors enhance the invulnerability, the performance and the structural integrity of these parts.

Although my invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:
1. In combination, a plurality of thermoelectric generators for converting solar energy into electrical energy, support means including a three-dimensional truss connecting said plurality of generators and forming an array in which said generators are parallel, portions of said support means developing varying temperatures, a coating of materials of preselected emissivities applied to at least a portion of said support means to maintain said support means at the same average temperature, and means including said support means electrically connecting said plurality of generators.

2. In combination, a plurality of thermoelectric generators for converting solar energy into electrical energy, support means including a three-dimensional truss connecting said plurality of generators and forming an array in which said generators are parallel, portions of said support means developing varing temperatures, surfaces of the support means having preselected emissivities to maintain said support means at the same average temperature, and means including said support means electrically connecting said plurality of generators.

3. A thermoelectric generator comprising a parabolic reflector having a reflective inner face and a highly emissive outer face for reflecting solar radiation from the inner face of said reflector upon a radiation collector positioned at the focus of said reflector for absorbing said radiation as heat energy, a thermocouple for converting said heat energy into electrical energy, said thermocouple having a hot junction and a cold junction, a thermal conducting element connecting said collector with said thermocouple hot junction, and means providing a continuous thermal conduction path between said thermocouple cold junction and said reflector for cooling said thermocouple cold junction by dissipating excess heat into space through the outer face of said reflector.

4. A thermoelectric generator comprising a parabolic reflector having a reflective inner face and a highly emissive outer face for reflecting solar radiation from the inner face of said reflector upon a radiation collector positioned at the focus of said reflector for absorbing said radiation as heat energy, a thermocouple for converting said heat energy into electrical energy, said thermocouple having a hot junction and a cold junction, a thermal conducting element connecting said collector with said thermocouple hot junction, means providing a continuous thermal conduction path between said thermocouple cold junction and said reflector for cooling said cold junction by dissipating excess heat into space through the outer face of said reflector, said continuous thermal conduction path including a flange conforming to the back face of the reflector, means for mounting said reflector on said flange, and an electrical insulating layer between said reflector and said flange for electrically insulating said thermocouple from said reflector.

5. A thermoelectric generator comprising a parabolic reflector having a reflective inner face and a highly emissive outer face for reflecting solar radiation from the inner face of said reflector upon a radiation collector positioned at the focus of said reflector for absorbing said radiation as heat energy, a thermocouple for converting said heat energy into electrical energy, said thermocouple having a hot junction and a cold junction, a thermal conducting element connecting said collector with said thermocouple hot junction, means providing a continuous thermal conduction path between said thermocouple cold junction and said reflector for cooling said thermocouple cold junction by dissipating excess heat into space through the outer face of said reflector, and means electrically connected with said thermocouple and including a portion of the thermal conduction path between said reflector and said thermocouple for conducting said electrical energy.

References Cited in the file of this patent

UNITED STATES PATENTS

| | | |
|---|---|---|
| 2,432,145 | Evans | Dec. 9, 1947 |
| 2,441,672 | Ray | May 18, 1948 |
| 2,864,879 | Toulmin | Dec. 16, 1958 |
| 2,946,945 | Regnier et al. | July 26, 1960 |

FOREIGN PATENTS

| | | |
|---|---|---|
| 732,338 | France | Sept. 19, 1932 |
| 864,964 | France | Feb. 10, 1941 |
| 123,378 | Russia | of 1959 |